March 30, 1954 M. M. CUNNINGHAM 2,673,587
METHOD AND APPARATUS FOR BUILDING COLLAPSIBLE CONTAINERS
Filed Dec. 10, 1952 4 Sheets-Sheet 1
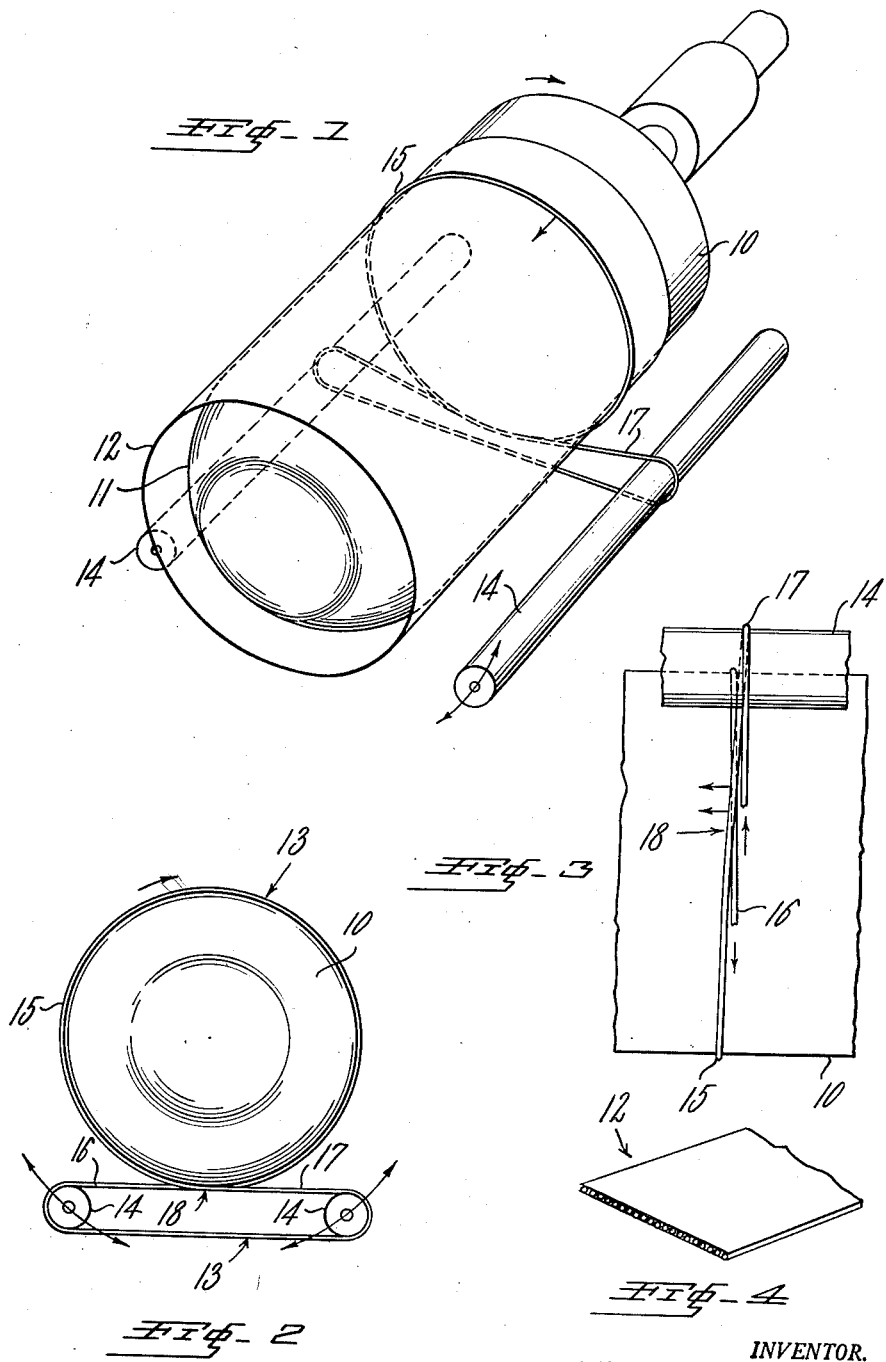
INVENTOR.
MARION M. CUNNINGHAM
BY David B. Miller
ATTORNEY

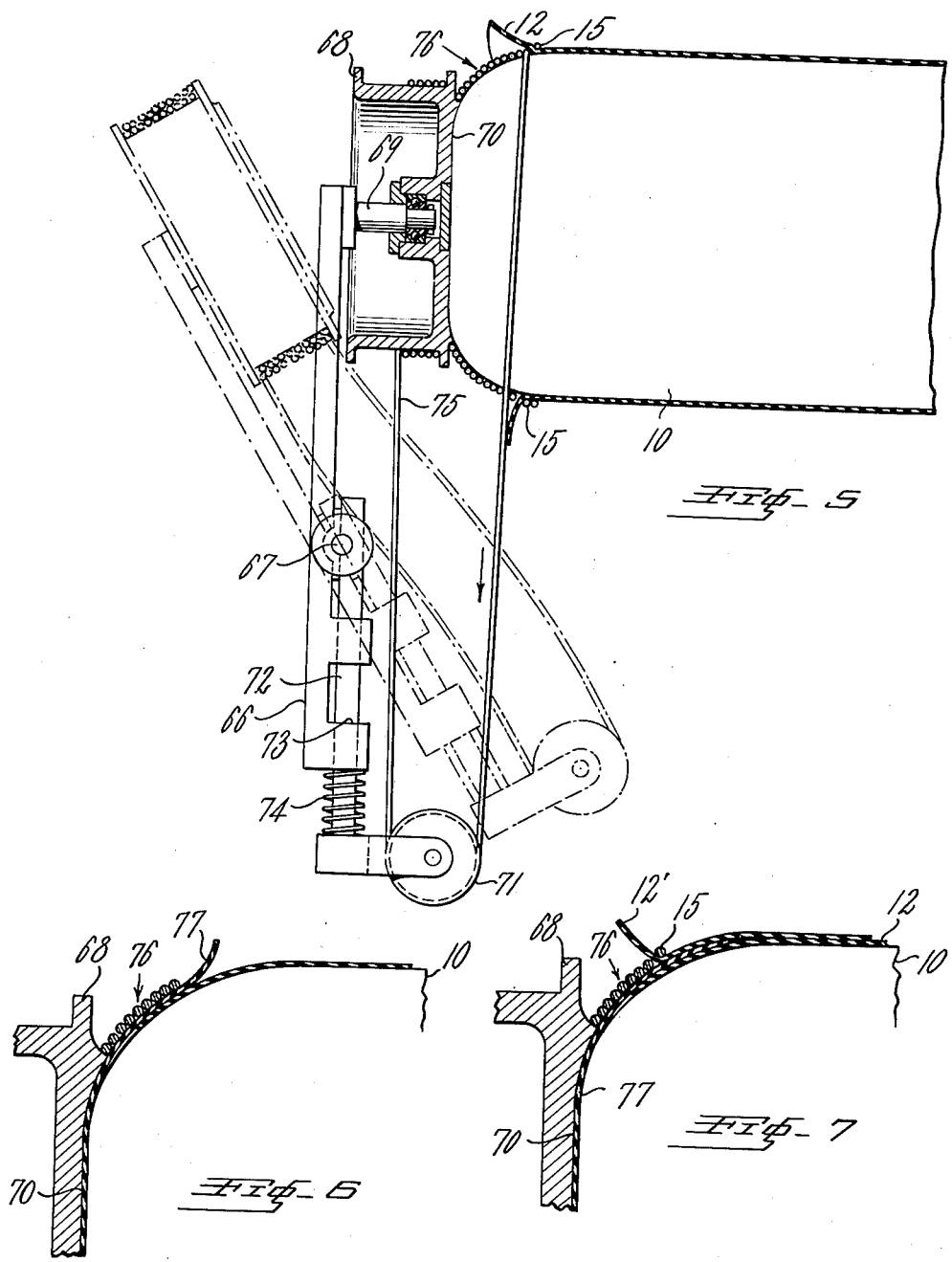

March 30, 1954 M. M. CUNNINGHAM 2,673,587
METHOD AND APPARATUS FOR BUILDING COLLAPSIBLE CONTAINERS
Filed Dec. 10, 1952 4 Sheets-Sheet 3
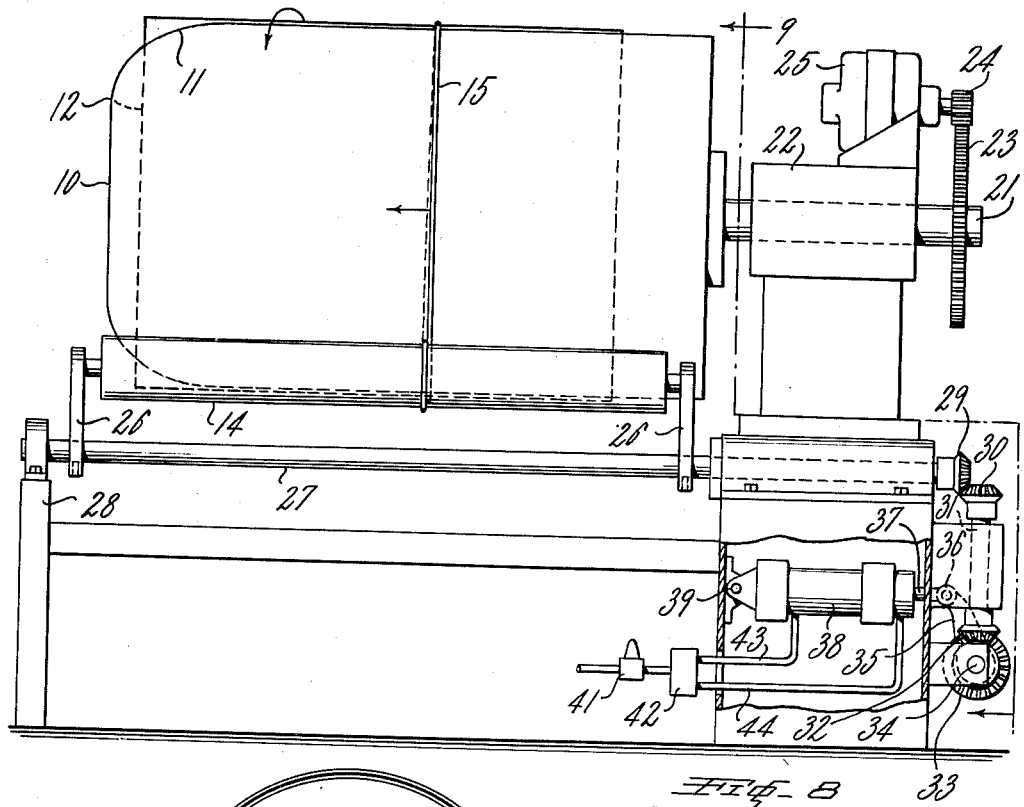
INVENTOR.
MARION M. CUNNINGHAM
BY
ATTORNEY March 30, 1954  M. M. CUNNINGHAM  2,673,587
METHOD AND APPARATUS FOR BUILDING COLLAPSIBLE CONTAINERS
Filed Dec. 10, 1952  4 Sheets-Sheet 4
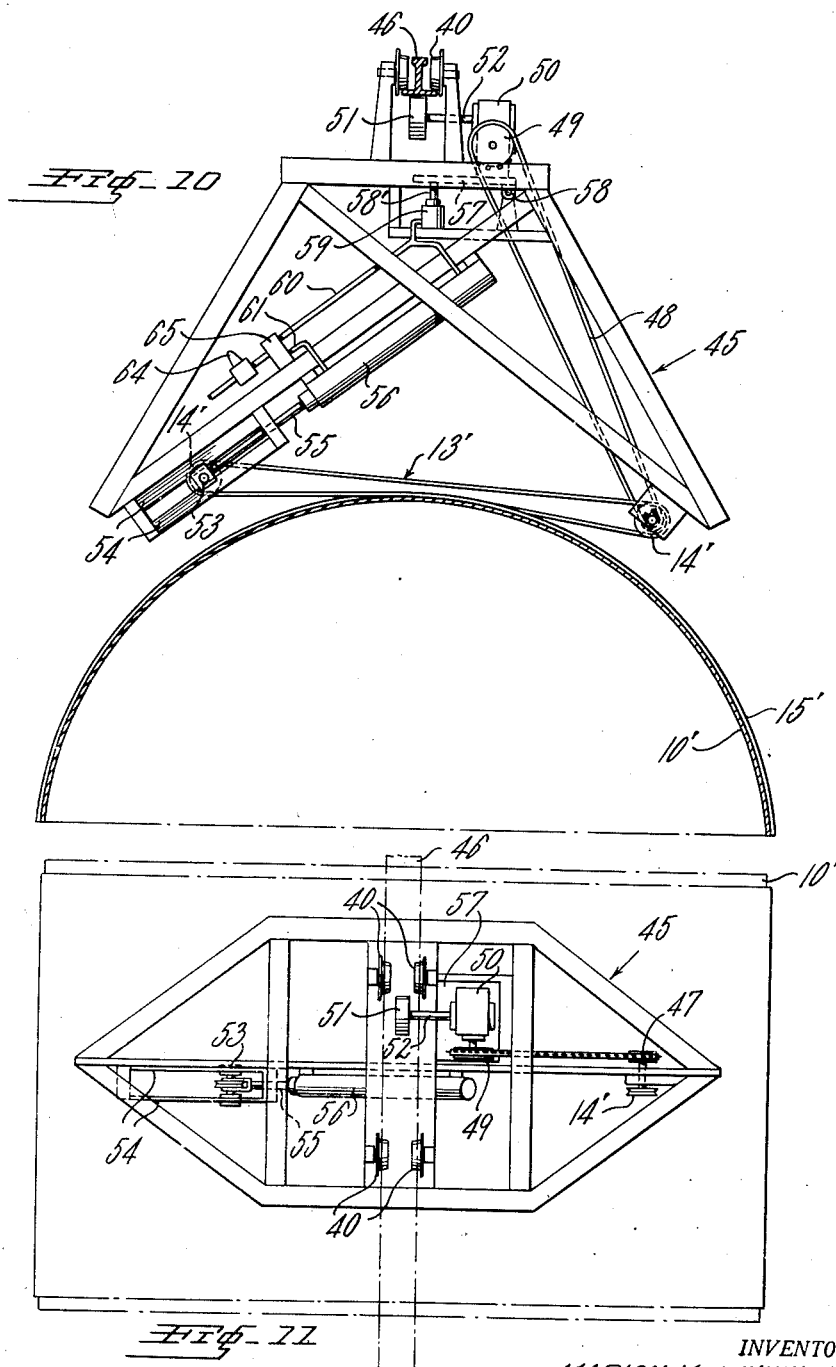
INVENTOR.
MARION M. CUNNINGHAM
BY David B. Miller
ATTORNEY Patented Mar. 30, 1954

2,673,587

UNITED STATES PATENT OFFICE 2,673,587

METHOD AND APPARATUS FOR BUILDING COLLAPSIBLE CONTAINERS

Marion M. Cunningham, Woonsocket, R. I., assignor to United States Rubber Company, New York, N. Y., a corporation of New Jersey Application December 10, 1952, Serial No. 325,063

19 Claims. (Cl. 154—1.8)

This invention relates to a method and apparatus for building collapsible containers of coated cord fabric, and in particular it relates to a method for building these containers by applying plies of cord fabric to a pre-shaped building form and rolling the plies down into snug engagement with the form to shape the container, and to apparatus for carrying out this method with facility.

In my Patent No. 2,612,924 there is disclosed a collapsible container formed of rubber coated cord fabric. As there disclosed, the walls of these containers are formed of a plurality of plies of coated cord fabric in which the cords of adjacent plies are disposed at an angle to each other. These containers are built on a substantially cylindrical building form which has one end closed and rounded. In building the containers, a ply of cord fabric is wrapped completely about the cylindrical portion of the building form, after which a ply of cord fabric is placed on the rounded end of the building form so that its edges overlie the body ply. The two plies are adhered to each by the tacky unvulcanized rubber; then a second ply of cord fabric is placed over the first, and this process is repeated until a wall has been built up having the requisite number of plies. The free end of this partially formed container is then turned on the building form, and the other end of the container is formed by repeating as nearly as is practicable the steps used to apply the first end. The shell is then removed from the building form and vulcanized to complete the walls of the container.

Inasmuch as the several plies of cord fabric are to form a unitary wall in the finished container, care should be taken to exclude any gases which may be trapped between the several plies of cord fabric during the building operation, so that pockets will not be formed in the walls of the container which would weaken the container in use. Further, because the walls of the container are shaped on the building form, the individual pre-cut plies should be laid tightly on the building form in close conformity with its outline. This becomes of particular importance when specially shaped containers having accurate cord angles such as that disclosed in the Prager copending application Serial No. 269,461, filed February 1, 1952, are made, for these containers would be shaped on a suitably shaped building drum, and the sheets of fabric would be cut accurately, so when pressed tightly against the form, the cords would be disposed at the proper angles in the container wall. In addition to the foregoing considerations, since it is most convenient to form the containers by a method which requires that the container walls be handled before they are vulcanized, it is desirable that the inherent tackiness of the uncured rubber be utilized to adhere the plies together to facilitate this handling. Therefore it is desirable that the several plies be pressed together to cause them to adhere to each other so that they may be handled more readily in the uncured state and so that the several plies will be vulcanized more readily into a unitary wall during the cure of the container.

This invention contemplates a method and apparatus for building containers of the type described, by the use of which the various pieces and plies of cord fabric can be rolled down into snug engagement with the building form; air trapped by the several plies of cord fabric can be expressed and excluded from beneath the cord fabric, and the several plies can be pressed together to cause them to adhere to each other during subsequent handling of the shell. This is accomplished by advancing longitudinally of the building form a pressure area which presses the cord fabric against the building form entirely around the circumference of the form, so that air trapped by the fabric is expressed before the advancing pressure area. At the same time the plies of fabric are pressed together and shaped to the outline of the form, and where necessary, the cord fabric is condensed so that it lies evenly on the building form. In its apparatus aspects, this invention contemplates in combination with a building form having cord fabric thereon a tensioned flexible cable having a loop about the form and over the fabric which presses the fabric firmly against the form completely about the form. For rolling the body ply of cord fabric against the form, this loop is formed in an endless flexible cable, and this cable and the loop are advanced longitudinally of the form. For rolling the end ply against the form, a flexible cable is placed against the end of the form, and this cable is coiled on the form from the center of the form outwardly and longitudinally about the curved end so that the last loop being laid in the coil advances a pressure area longitudinally of the form. In sweeping that part of the body ply which overlies the rounded end portion of the form, the coiled cable cooperates with the cable loop in the endless flexible cable to advance the loop in this latter cable uniformly and without slippage to condense the cord fabric and press it smoothly against the form.

In a preferred embodiment of the apparatus for pressing a body ply against the form, two rollers having their axes disposed substantially parallel to the axis of the building form are spaced from the form, and an endless flexible cable is crossed near its mid portion to form a figure 8. One loop of the cable runs about the building form over the fabric, and the other loop of the cable runs about the rollers. Preferably, the rollers are positioned in such a manner relative to the building form that the cable loop over the fabric has a sweep ratio of 1, i. e., it presses against the fabric throughout at least 360° of the circumference of the building form. One or more of the rollers is movably mounted so that it may be moved in a direction to tension the endless cable and to tend to loop the cable through more than 360° of the circumference of the building form. In this manner pressure is exerted on the fabric, and the cable is maintained in tight frictional contact with the fabric and the building form, so that as the building form is rotated the cable will be moved along the figure 8 path.

Since the cable is tensioned, all portions of the cable will tend to lie in a common plane. This however is impossible because at the cross-over point of the figure 8 one portion of the cable must be displaced laterally relative to another portion of the cable. Consequently there is a resultant force at right angles to the plane of the cable, hence longitudinally of the building form, acting on the cable at the cross-over point which causes that portion of the cable advancing to the building form to be displaced longitudinally thereof; so the cable loop traverses the building form. This can be seen more readily if, as preferably occurs in practice, the apparatus be considered when the loop about the building form extends through somewhat more than 360° of the circumference of the form. In this case, the portion of the cable being laid on the form is being applied at a point circumferentially of the form where the cable already on the form has not yet lost contact with the cord fabric. A crossing point of the two portions of the cable occurs at the point where the advancing cable is being laid on the cord fabric. The lateral forces at this point tend to displace one of the portions longitudinally of the building form, and since the advancing cable is more free to move than that portion which is in frictional contact with the cord fabric, the advancing cable is laid in side-by-side relation to that portion of the cable already on the fabric. In this manner the cable loop is displaced longitudinally of the building form a distance equal to the diameter of the cable for each revolution of the building form.

Since at least one of the rollers is movably mounted to tension the cable, when the cable loop reaches a narrowing portion of the building form such as will occur at the rounded end portion the movable roller will move in a direction to take up the slack thereby created in the endless cable and to maintain the loop tightly and completely about the smaller circumference of the building drum at this point. Preferably the movable roller is urged by a yielding means exerting a substantially uniform tension on the cable to press the fabric against the drum with a substantially uniform pressure. This yielding means urging the roller to tension the cable may conveniently take the form of an air cylinder under a substantially uniform fluid pressure.

In a preferred form of the apparatus for applying the end fabric, a member having a surface adapted to cooperate with the end of the building form is positionable in contact with the end of the building form. A tensioned flexible cable has one end fixed to this member near its cooperating surface, so as the building form and the member are rotated the cable will be wrapped around this member at the edge of its cooperating surface, and will be coiled against the end of the form.

For a better understanding of the nature of this invention, reference should be had to the following description of exemplary embodiments thereof and to the accompanying drawings, wherein:

Fig. 1 is a perspective schematic view of a building form, cable and rollers illustrating the principles of the body ply roller of this invention;

Fig. 2 is an end elevational view of the device shown in Fig. 1;

Fig. 3 is a detailed view showing the cable cross-over point and illustrating the manner in which the cable loop is traversed longitudinally of the cord fabric;

Fig. 4 is a perspective view of a piece of cord fabric showing the disposition of the cords embedded in rubber;

Fig. 5 is a side elevational view of apparatus suitable for applying the end fabric and for controlling the sweep of the loop on the curved end portion;

Fig. 6 is a side elevation similar to Fig. 5 illustrating the manner in which an end ply is laid on the building form;

Fig. 7 is a view similar to Fig. 5 but showing the laying of a body ply after a first body and end ply have been laid on the form;

Fig. 8 is a side elevational view of an apparatus embodying the principles illustrated in Figs. 1–3;

Fig. 9 is a view on the line 9—9 of Fig. 8;

Fig. 10 is an end elevational view of another form of apparatus for sweeping the cable loop longitudinally of the body fabric; and Fig. 11 is a top plan view of the apparatus shown in Fig. 10 but having the building drum foreshortened.

Referring now to the drawings there is illustrated a method and apparatus for building containers according to this invention. In Figs. 1–3, apparatus for traversing the body ply of fabric is shown in schematic form. This apparatus comprises a rotatable substantially cylindrical building form or drum 10, which may have one end tapered as shown at 11 when a container having the rounded end portions disclosed in the above-mentioned Prager application is being constructed. As disclosed in the above-mentioned Cunningham application, the container is built by applying sheets of rubber coated cord fabric 12 to the surface of the drum 10 so the sheets form a substantially cylinder sleeve which conforms to the shape of the external surface of this drum. A plurality of these sheets 12 would be applied to the drum 10 in a manner such that the cords in adjacent sheets of the fabric are disposed at a substantial angle to each other to build up a container wall having the requisite strength.

It will be appreciated that as the sheets 12 are applied to the form 10 air will be trapped between the first sheet 12 and the drum 10 and between succeeding sheets of the cord fabric as they are applied over the first sheet on the drum. These air pockets will prevent the cord fabric 12 from conforming to the shape of the building drum, and the air pockets which occur between succeeding layers of cord fabric would tend to maintain the several sheets of cord fabric separated during vulcanization of the container, so that the container would have local weak areas where these bubbles were trapped. Further, the trapped air will prevent the fabric's conforming to the shape of the building form, yet since the contours of the container are to be shaped accurately and since the cords of the cord fabric are to be disposed in the container wall in a precise position to provide maximum strength in the accurately shaped container, any deviation from this shape caused by the failure of the cord fabric to conform accurately to the surface of the building drum 10 in the first instance will result in a weakening of the container walls. Therefore, it is of great importance that the sheets of fabric which are to make up the container walls be pressed down into tight engagement with each other and with the form 10. The method and apparatus illustrated in Figs. 1–3 will press the body ply 12 into engagement with the drum easily and speedily.

As best shown in Fig. 2 this means for rolling the fabric against the building drum comprises in combination with the drum a cable 13 and a pair of rollers 14 spaced from the drum and having their axes disposed substantially parallel to the axis of the building drum. The endless flexible cable 13 is disposed on the drum 10 and rollers 14 so that in end view it presents the appearance of a distorted figure 8. The upper loop of the figure 8 is formed by a reach 15 of the cable which substantially encircles the building drum 10 and overlies the fabric 12. A reach 16 of the cable extends from a point of tangency with the building drum 10 about a first of the rollers 14 to track thereabout, and a second reach 17 extends from a point of tangency with the building drum 10 in a generally opposed direction to the first reach 16 and about the other roller 14 to track thereabout. There is thus provided a cross over point 18 where one portion of the cable is in contact with another portion thereof. Although as shown in Fig. 2, the rollers 14 are positioned such that the loop 15 just encircles the circumference of the drum 10, one or more of the rollers 14 may be moved upwardly or upwardly and outwardly as indicated by the arrows in Fig. 2, so that the angular distance along the cable from the point of tangency of the reach 16 with the drum 10 to the point of tangency of the reach 17 with the drum 10 would exceed 360°. As pointed out above, the rollers 14 preferably are positioned relative to the drum 10 so that this loop 15 extends throughout at least 360° of the circumference of the drum throughout the operating sweep of the cable.

In addition to increasing or decreasing the degree of encirclement of the drum 10 by the loop 15 which is described above, the roller movement will tension or relax the cable 13. Thus as seen in Fig. 2 if the roller 14 were moved generally upwardly and outwardly as indicated by the arrow, the cable 13 would be tensioned, and conversely were the roller 14 moved generally downwardly and inwardly as indicated by the arrows the cable 13 would be loosened. In using an apparatus embodying the principles illustrated in Figs. 1–3 to build a container, a ply of cord fabric 12 would be laid over the drum 10 about the circumference thereof, and with the roller 14 in the cable loosening position the loop 15 would be placed over the fabric 12. The roller 14 would then be moved in a direction to tighten the cable so that the loop 15 presses against the fabric throughout the circumference of the drum, and so that the cable 13 is maintained tensioned. The cable 13 is then moved, either by rotating the rollers 14 or the drum 10 but preferably the latter, and as the cable moves about the drum 10 the loop 15 traverses the fabric longitudinally in the direction indicated by the arrow in Fig. 1. As the loop 15 moves longitudinally of the fabric, it forces the fabric 12 into conformity with the drum 10 and sweeps any air trapped by the fabric when it was applied to the drum before the loop 15 to express this trapped air from beneath the ply of fabric.

For a better understanding of the method in which the cable loop 15 is swept longitudinally of the fabric, reference should be had to Fig. 3 where the various reaches of cable near the cross-over point 18 are illustrated. The reach 16 of the cable is shown as leaving the surface of the fabric at a point of tangency with the drum 10 which point is a short distance down-cable from the cross-over point 18. Similarly the reach 17 is shown arriving at the drum to contact the fabric at the cross-over point 18. The cable 13 is in contact with the fabric from the point of tangency of the reach 16, past the cross-over point, and around the drum to the point 18, so that two portions of the cable lie side by side in contact with the fabric a short distance along the form, i. e., from the point of tangency of reach 16 to the point 18. Since the cable 13 is under tension, the loops of the distorted figure 8 tend to lie in a common plane, but because of the cross-over point, this is impossible, and one of the reaches 16, 17 must be displaced laterally from the other. The supply end of the reach 16 is in frictional contact with the cord fabric, hence it is not readily displaced; so the reach 17 which has its supply end relatively free to move is displaced laterally as indicated by the arrows, so the reach 17 is laid beside the reach 16, and the cable 13 moves longitudinally of the smooth rollers 14 and the drum 10. Thus the loop 15 is swept longitudinally of the fabric a distance equal to the diameter of the cable 13 for each revolution of the drum 10.

When this loop 15 of the cable 13 arrives at the tapered end portion 11 of the building form, the roller or rollers 14 which are movable should be moved in a direction to take up the slack in the cable 13 that results from a decrease in the circumference of the building form. To take up this slack as well as to maintain the cable 13 under a substantially uniform tension, the roller 14 may conveniently be urged in a direction to tension the cable at all times during the sweep of the cable loop 15. Since the cable loop 15 is maintained encircling the form even when it arrives at the tapered end portion, it will condense the cord fabric which overlies this tapered end portion, i. e., it will force the cords more closely together by displacing the rubber lying between the individual cords. In this manner the cord fabric 12 is rolled down into smooth snug engagement with the building form throughout the entire surface area of the fabric sheet.

If the taper of the end portion is not too great, the friction of the cable 13 on the fabric 12 will prevent the cable loop from slipping longitudinally of the form when it traverses this portion of the building form. Should the taper of the end portion for any given container shape be too great, or should it be desired to roll the body ply over the end to a point where slippage of the cable loop 15 occurs, suitable means may be provided to prevent the cable's moving at a speed greater than that required by the diameter of the cable and the rotational speed of the form. A suitable means for performing this function, and one which also is suitable for laying the end ply of the container on the building form is illustrated in Figs. 5-7.

In Fig. 5 this mechanism is shown as it would be used in cooperation with mechanism such as that illustrated in Figs. 1–3 to lay a first body ply of cord fabric on the building drum. This mechanism comprises an arm 66 pivoted at 67 and carrying at one end thereof a spool 68 journalled on extension 69 of the arm 66. The spool 68 has a face 70 having a complementary curvature to a portion of the end of the building form. The arm 66 may be pivoted about the shaft 67 to bring this surface 70 into engagement with the building drum 10 as shown in solid lines, or it may be moved out of engagement therewith as shown in dotted lines, and since the spool 68 is journalled on extension 69, when the face 70 is held in frictional contact with the building form 10, the spool 68 will be rotated as the building form is rotated. The arm 66 also carries a pulley 71 mounted on a rod 72 slidable in the mounting 73 on the arm 66. A spring 74 urges the rod 72 in a direction to move the pulley 71 away from the spool 68. The spool 68 has wound thereon a flexible cable 75 which is similar to the flexible cable 13. From the spool 68, the flexible cable 75 is led about the pulley 71 back to the spool 68 to which it is affixed at an external point adjacent the surface 70, so that when the surface 70 is placed in contact with the drum 10 the cable 75 can be coiled on the form 10. The cable 75 is wound on the spool 68 in a direction such that when the spool 68 is in contact with the drum 10 and the drum 10 is rotated in a direction to advance the cable loop 15 toward the spool 68, the cable will be rewound on the spool 68. Thus when the building form 10 is rotated in the opposite direction, the cable 75 will be unwound from the spool 68.

To use this apparatus to prevent slippage of the cable loop 15, the face 70 is placed in contact with the building form 10, and the building form 10 is rotated in a direction to unwind the cable 75 from the spool 68. Since the end of the cable 75 is affixed to the spool 68 near the surface 70 thereof; as the cable is unwound from the spool 68, it will be rewound in the form of a coil 76 on the end of the building form 10. The building form 10 is rotated until the cable 75 is coiled on the drum under the fabric 12 up to the point where slippage of the cable loop 15 would begin. The cable loop 15 is next placed over the fabric 12 immediately adjacent the last coil of the cable 75, after which the cable 13 is tensioned. The form 10 is then rotated in a direction to advance the cable loop 15 toward the spool 68. As the drum 10 is rotated in this direction, the cable 75 is simultaneously uncoiled from the end of the form 10 and rewound on the spool 68. Thus as the cable loop 15 advances, the cable 75 is uncoiled; so the loop 15 advances to the position vacated by the uncoiling cable 75, and advances only as the cable 75 is uncoiled. In this manner the edge of fabric 12 is "drawn off" between the last coil of the cable 75 and the loop 15, and is condensed and rolled into smooth engagement with the building form 10 by the cable loop 15.

Referring next to Fig. 6, there is illustrated the manner in which the apparatus shown in Fig. 5 can be used to apply the end ply. An end ply of fabric 77 is first placed on the face 70 so that its edges extend beyond this surface and are adapted to extend in overlapping relationship with the edge of the ply 12. The face 70 is positioned against the drum 10 with the ply 77 trapped between the face 70 and the end of the drum. The drum 10 is then rotated in a direction to unwind the cable 75 from the spool 68 and to coil it in the form of a coil 76 over the end ply 77 and against the building form 10. As the cable 75 is coiled about the building form 10, the pressure area exerted by the cable 75 on the end ply 77 will advance outwardly from the spool 68 toward the edges of the ply 77 to lay the cord fabric in smooth even engagement with the end of the building form 10. Since the cable 75 is maintained tensioned by the spring 74, this fabric 77 will be pressed against the end of the form 10 by a substantially uniform pressure.

Referring next to Fig. 7, the apparatus of Fig. 5 is shown when used to apply a second body ply of cord fabric to the building form 10. A first ply 12 and an end ply 77 have been applied to the building form 10 in the manner heretofore described. A second ply 12' of cord fabric is being applied to the first ply 12 and end ply 77 which at this stage effectively constitute a portion of the building drum 10. As shown in the figure, the plies 12, 12' and 77 are applied to the building form 10 in a manner such that their edges interleave.

Referring next to Figs. 8 and 9, there is shown one form of apparatus embodying the principles illustrated in Figs. 1–3. This apparatus comprises the drum 10 having the plies of cord fabric 12 laid thereon. The drum 10 is supported in cantilever fashion from a shaft 21 journaled in the support housing 22. A gear 23 is fixed to the end of the shaft 21 and meshes with a gear 24 fixed to the shaft of a suitable motor 25. The rollers 14 are mounted beneath the drum 10 and on either side of the axis thereof. Each roller 14 is an elongated cylindrical member extending substantially the entire length of the building drum to cover the entire sweeping range of the loop 15, and each roller is rotatably mounted in a pair of swinging arms 26 which are fixed at their opposite ends to a rotatable shaft 27. The rotatable shafts 27 are journaled in the framework 28. Each rotatable shaft 27 has mounted at one end thereof a bevel-gear 29 which meshes with a similar bevel-gear 30 mounted on the upper end of a vertical shaft 31 which is journaled on the framework 28. The shafts 31 have bevel-gears 32 mounted at the other end thereof which mesh with bevel-gears 33 mounted on a common horizontal shaft 34. The gears 32, 33 and the gears 29, 30 for each of the roller shafts 27 are mounted in such a manner that as the shaft 34 is rotated in one direction the shafts 31 and 27 for a first roller 14 rotate in an opposite direction to the shafts 31 and 27 for the other roller 14. Thus as seen in Fig. 9 as the shaft 34 is rotated toward the observer both of the rollers 14 are moved simultaneously from the cable loosening positions shown in dotted lines to the cable tightening positions shown in full lines to tighten the cable 13.

A crank arm 35 is fixed to the shaft 34 to rotate this shaft. At its other end the crank arm is pivoted by a pin 36 to a piston rod 37 which is actuated by a piston in the cylinder 38. This cylinder 38, as best shown in Fig. 8, is pivoted to the framework 28 by a pin 39; so as the piston is actuated in the cylinder 38, the cylinder may swing upwardly or downwardly as required to permit the pin 36 to traverse the arcuate path required by crank arm 35. Air is supplied from a source (not shown) through a regulating valve 41 to a distributing valve 42 which is positionable to supply air pressure selectively to the pipes 43 and 44 connected to opposite ends of cylinder 38 to actuate the piston rod 37 in one direction or the other.

To prepare this apparatus for sweeping the fabric, the valve 42 is first adjusted to supply air to the pipe 43. The piston in the cylinder 38 and piston rod 37 are thereupon moved to the right as seen in Fig. 8 to rotate the crank arm 35 and shaft 34 in a clockwise direction. Through the gears 33, 32, the shafts 31, and the gears 30, 29; the shafts 27 are rotated in a direction to lift the rollers 14 generally upwardly and outwardly toward the full line position shown in Fig. 9. In this manner the cable 13 is tensioned and the loop 15 of this cable is made to press the fabric 12 against the drum 10. Since the shafts 27 are actuated ultimately from the cylinder 38 which is under a regulated air pressure, the loop 15 will press the fabric against the drum with a substantially uniform pressure as it traverses the fabric. This pressure will be maintained as the loop sweeps over the tapered portion 11 of the drum because the rollers 14 under the urging of the cylinder 38 are movable in a direction to tension the cable 13 and to maintain the loop 15 completely about the circumference of the drum 10.

Since the cable 13 is in frictional contact with the fabric 12, hence ultimately the drum 10, the cable can be made to move by rotating the drum 10. Thus to sweep the cable loop 15 longitudinally of the fabric in the manner heretofore described, the motor 25 is actuated, and through the gears 24, 23 and the shaft 21 the drum is rotated.

Referring next to Figs. 10 and 11, there is shown another apparatus embodying the principles illustrated in Figs. 1-3 wherein the cylindrical rollers 14 which extend substantially throughout the length of the drum 10 are replaced by a pair of rollers 14' in the form of pulleys. Whereas when the cylinders or rollers 14 are used, the loop of the cable about these cylinders will walk along the cylinders as the cable loop 15 sweeps the drum 10; the pulleys 14' must be moved longitudinally of the drum 10' as the loop 15' of the cable 13' sweeps longitudinally of the drum 10'. To move the rollers 14' longitudinally in unison, they are mounted on a common carriage 45 which is suspended on wheels 40 from a monorail 46 that extends along the length of the drum 10'. The movement of carriage 45 should be coordinated with the advance of cable loop 15'. Since the advance of loop 15' is a function of cable diameter and rotational speed of the drum 10', the carriage travel is coordinated with the cable speed by means of a sprocket 47 fixed to the shaft of a roller 14'. The sprocket 47 by means of the chain 48 drives a sprocket 49 of a speed reducing mechanism 50. A roller 51 is affixed to the output shaft 52 of the speed reducing mechanism, and this roller 51 is movable into frictional engagement with the mono-rail 46; so the speed reducing mechanism 50, and consequently the carriage 45 and rollers 14', are moved longitudinally of the mono-rail 46, hence of the drum 10', as the roller 51 rotates. The speed of rotation of the roller 51 is suitably coordinated with the rotational speed of the drum 10' by means of the speed reducing mechanism 50, so that portion of the cable 13' which is being laid on the drum 10' will be laid immediately adjacent that portion of the cable which is leaving the drum.

In the embodiment shown in these figures the means for tensioning the cable 13' comprises a movable mounting 53 for one of the rollers 14'. This mounting 53 may slide upwardly and generally inwardly relative to the axis of the drum 10' to loosen the cable 13', or downwardly and generally outwardly to tension the cable 13'. To provide this movement the mounting 53 is slidably mounted in a guideway 54 affixed to the carriage 45, and a piston rod 55 actuated by a piston in the cylinder 56 slides the support 53 in the appropriate direction to tighten or loosen the cable 13'.

The roller 51 and speed reducing mechanism 50 are mounted on a movable platform 57 pivoted for rotation about the shaft 58 which is spaced from the roller 51 in the direction of the shaft 52. Thus the roller 51 may be pivoted up to a position where it is in frictional driving engagement with the mono-rail 46, and it may be moved out of engagement with this mono-rail. The platform 57 is moved by a piston rod 58' controlled by an air cylinder 59 fixed to the carriage 45. The piston rod 58' bears against the underside of platform 57 at a point spaced from the shaft 58, and the movement of this rod is coordinated with the piston in the air cylinder 56, so that as air is admitted to cylinder 56 to tension the cable 13' air is admitted to cylinder 59 to move the roller 51 into frictional engagement with the mono-rail 46. Both cylinders 56 and 59 are actuated from a common air pipe 60. An additional air pipe 61 leads to the opposite end of the cylinder 56 to release the cable 13'. Air from a source (not known) is led through a regulating valve 64 to a distributing valve 65 which may be adjusted to admit pressurized air selectively to either of the pipes 60 or 61.

The operation of this embodiment in principle is substantially the same as that shown in Figs. 8 and 9. To press a fabric against the drum 10' with this apparatus, the carriage would be disposed at one end of the fabric and the cable loop 15' would be placed about the drum 10' as heretofore described. Air pressure is admitted to the pipe 60 to move the roller 14' and tension the cable 13'. Simultaneously therewith the roller 51 is raised into engagement with the mono-rail 46. The drum 10' is then rotated by a motor (not shown), and as the cable 13' is thereby moved, the rollers 14' and sprocket 47 are rotated so that the roller 51 rotates against the mono-rail 46. As the roller 51 is rotated the carriage 45 and consequently the rollers 14' are moved along the drum 10'; hence the cable loop 15' is swept along the drum 10' in the same manner that the cable loop 15 sweeps the drum 10 in the embodiment shown in Figs. 8 and 9.

Having thus described my invention, what I claim and desire to protect by Letters Patent is:

1. The method of making a collapsible container having a substantially cylindrical body and a tapered end, which comprises placing a ply of coated cord fabric about a rotatable building form having a substantially cylindrical body and a rounded end, placing against the end of the building form a ply of cord fabric of sufficient size that the edges of the end ply and of the body ply will overlap, then smoothing one of the fabrics down against the other at its edges simultaneously entirely around the form by looping a cable tightly about the body ply to press it against the form, coiling a second cable tightly against the end ply to force it against the form in underlying relation to the edges of the body ply, and rotating the form to uncoil the second cable and to advance the loop of the first cable longitudinally of the form to the position vacated by the second cable as the second cable uncoils to thereby condense the edge of the body ply of cord fabric and press it down evenly into tight engagement with the end ply and the building form.

2. The method of making a flexible container having a cylindrical body and rounded ends, which comprises placing about a cylindrical form having a rounded end a sheet of coated cord fabric, then smoothing the sheet down against the cylindrical portion and rounded end portion of the form by looping a cable entirely around the form to embrace the sheet of cord fabric, and rotating the form so that the cable travels along the form in embracing relation with the sheet, coiling a second cable against the rounded end of the form so that it will press against the form to prevent longitudinal slippage of the first cable loop on the rounded end portion, and then unwinding the coiled cable as the first cable travels along the sheet to the position being vacated by the second cable.

3. Apparatus for building a container having rounded ends, comprising a building form having a cylindrical body and a tapering end, an endless flexible cable having a loop about the form adapted to be placed over a body ply of coated cord fabric and to press said ply against the form entirely around the form, means for traversing said cable loop longitudinally of the form, a second flexible cable coiled tightly against form, a second flexible cable coiled tightly against the tapered end portion said coil being adapted to extend under the edge of the body ply to prevent slippage of the cable loop on the tapered end of the form, and means for rotating the form to uncoil said second cable and to advance said cable loop longitudinally of the form to the position vacated by the uncoiling cable, whereby the edges of the body ply are condensed and pressed into snug engagement with said rounded end portions.

4. Apparatus for building a container having a cylindrical body and rounded ends, comprising a building form having a substantially cylindrical body and a tapering end, said form being adapted to receive a ply of coated cord fabric on said cylindrical body to have an edge projectable over said tapering end and to receive a ply of cord fabric against its end to have its edges projectable into overlapping relationship with the edge of the body ply, a first flexible cable coiled on the end of said building form adapted to press the end ply into snug engagement evenly with said tapering end, an endless flexible cable having a loop over the building form adapted to overlie the body ply and to press the body ply against the form substantially entirely around the form, means for traversing said cable loop longitudinally of the form as the form is rotated, and means for rotating the form to uncoil said coiled cable and to advance said cable loop longitudinally of the form to the position vacated by the uncoiling cable.

5. Apparatus for building a collapsible container, comprising in combination a building form having a rounded end portion, said form being adapted to receive a ply of cord fabric having one end projectable over said rounded end portion, a first flexible cable encircling said form and adapted to press the fabric against the form, said cable being adapted to traverse a pressure area longitudinally of the form, said pressure area extending throughout the circumference of the form as it traverses the form, a coiled flexible cable coiled tightly against the rounded end portion of the form, said coiled cable being adapted to extend under the portion of the cord fabric which is projectable over said rounded end portion, said coiled cable being adapted to prevent longitudinal slippage of said first cable, and means for rotating the form to uncoil said coiled cable from the form and to advance the pressure area exerted by said first flexible cable longitudinally of the rounded end portion of the form to the position vacated by the uncoiling cable as said coiled flexible cable is uncoiled, whereby the portion of the fabric which is projectable over said rounded end portion is condensed and pressed into snug engagement with said rounded end portion.

6. An apparatus for building a container of a plurality of plies of coated cord fabric adhered to each other, comprising a building form adapted to receive cord fabric thereon, an endless flexible cable having a loop substantially encircling said form positionable to overlie the fabric, a roller spaced from the form on which said cable runs, said roller, form and cable being constructed and arranged to traverse the cable loop axially of the building form over the fabric as the cable is driven, a tensioner urging said roller in a direction to tension the cable to press it against the form, and means for driving said cable, whereby fabric on the form will be pressed thereagainst by the cable loop to express air trapped by the fabric.

7. Apparatus for building a collapsible container of a plurality of plies of coated cord fabric, comprising in combination a building form having cord fabric thereon, a plurality of rollers spaced from the building form, an endless flexible cable on the building form and the rollers, said cable being crossed to form loops, one of said loops completely encircling the circumference of the building form over the fabric, another of said loops running on said rollers, a tensioner urging at least one of said rollers in a direction to tension said cable and maintain said cable loop completely about the circumference of the form, and means for driving the cable and rotating the building form, whereby the fabric is pressed between the cable and the form and conformed to the shape of the building form as the cable loop advances axially of the building form.

8. In apparatus for building a collapsible container of a plurality of plies of coated cord fabric adhered to each other, means for pressing upon the plies to cause them to adhere to each other and for expressing gases trapped by the plies, comprising in combination a building form on which the cord fabric is laid in successive plies to build the container, said building form having a tapering portion, a cable having a loop about the form over the fabric to press the fabric against the form, a rotatable element on which the cable tracks, means for urging said rotatable element in a direction to apply tension to the cable to compress the fabric between the form and cable, said rotatable means being constructed and arranged to advance the cable loop axially of the building form as the cable moves about the rotatable element to advance its pressure area on the fabric longitudinally thereof, and means for rotating the building form to advance the cable.

9. Apparatus for adhering a plurality of plies of coated cord fabric to each other and for expressing air trapped between the plies, comprising in combination a building drum having cord fabric thereon, an endless flexible cable having a loop extending completely about the circumference of the drum over the fabric, a roller spaced from the drum about which the cable tracks, pneumatic means under substantially uniform fluid pressure for urging said roller in a direction to tension the cable and press the fabric under the cable loop against the form with substantially a uniform pressure, said roller being constructed and arranged to advance the cable loop longitudinally of the form as the cable travels about the roller, and means for driving the cable to advance the pressure area between the cable and the form longitudinally of the fabric.

10. Apparatus for expressing air trapped by plies of cord fabric on a building form, comprising in combination a building form having cord fabric thereon, a flexible cable over the fabric pressing the fabric against the form, a roller spaced from the form on which the cable runs, a pneumatic cylinder under substantially constant air pressure urging said roller in a direction to tension the cable and press the fabric under the cable against the form with a substantially uniform pressure, said roller being constructed and arranged to advance the pressure area between the form and the cable longitudinally of the drum as the cable travels on the roller, and means for driving the cable to advance the pressure area between the cable and the form longitudinally of the fabric.

11. Apparatus for conforming a sheet to a building form, said apparatus comprising a substantially cylindrical building form having the sheet therearound, an endless flexible cable, said cable being arranged to form a plurality of loops, one of said loops being disposed about said form over said sheet to completely encircle the form and press the sheet toward the form, a cylinder spaced from the form extending therealong and having its axis disposed substantially parallel to the axis of said form, another of said loops being disposed over said cylinder so the cable runs on the cylinder, and means for driving said cable and rotating the form, whereby the cable loops are advanced axially of the cylinder and form and the pressure area of the cable on the sheet is swept longitudinally of the sheet to conform the sheet to the configuration of the building form.

12. Apparatus for expressing air trapped by sheets placed on a building form, comprising a substantially cylindrical building drum, said drum having a sheet wrapped therearound, an endless flexible cable, said cable having one reach disposed about the drum over the sheet, cylindrical rollers spaced from the drum having their axes substantially parallel to the axis of the drum, a second reach of said cable extending from a point of tangency with said drum about a first of said cylindrical rollers, a third reach of said cable extending in an opposed direction from a point of tangency with said drum about a second of said rollers, said rollers being disposed so that the reach of cable over the sheet will completely encircle the drum throughout the operating sweep of the cable, a pneumatic piston under a substantially uniform fluid pressure urging at least one of said rollers in a direction to tension said cable and to maintain said cable completely encircling the drum, and means for driving said cable and rotating the drum, whereby the cable reach about the drum is swept axially of the drum across the sheet to compress the sheet between the cable and the drum.

13. In apparatus for building a collapsible container of a plurality of plies of coated cord fabric adhered to each other, comprising a building form having coated cord fabric thereon, a plurality of cylindrical rollers spaced from the form and extending therealong, said cylindrical rollers having their axes disposed substantially parallel to the axis of the form, an endless flexible cable looped about the form over the fabric to press the fabric against the form, said cable being disposed to run on said rollers, a piston under a substantially uniform pressure urging at least one of said cylindrical rollers in a direction to tension said cable so the cable loop exerts a substantially uniform pressure on the fabric as it traverses the fabric, and means for driving the cable, whereby the cable loop traverses the fabric to press it toward the drum throughout its length.

14. In apparatus for building a container of coated cord fabric, means for conforming the fabric to the shape of a building form and for expressing air trapped by the fabric, comprising in combination a building drum having cord fabric thereon, an endless flexible cable having a loop extending completely about the circumference of the drum over the fabric, a plurality of cylinders spaced from the drum and extending longitudinally thereof on which the cable runs, said cylinders having their axes disposed substantially parallel to the axis of the drum, means urging at least one of said cylinders in a direction to tension the cable, and means for rotating said drum to drive the cable, whereby the pressure area on the fabric between the cable and the drum is moved longitudinally of the fabric as the cable loop so moves to press and condense the fabric to fit the drum.

15. In apparatus for building a container of coated cord fabric, a cylindrical building form having a rounded end, said form having cord fabric wrapped therearound, rollers spaced from the form extending longitudinally of the form, at least one of said rollers being mounted for swinging movement toward and away from the form, an endless flexible cable disposed on said form and rollers and being arranged to have two loops and a crossing area between the loops, a first of said loops being disposed about the drum over the fabric, a second of said loops being disposed about the rollers, means urging said swinging roller in a direction to tension said cable and maintain said first loop completely encircling the form, and means for rotating said form to sweep the cable loop about the form longitudinally of the fabric to conform the fabric to the shape of the form.

16. Apparatus for causing a plurality of plies of coated cord fabric to adhere to each other and for expressing air trapped by the plies, comprising in combination a building form having cord fabric thereon, an endless flexible cable having a loop extending completely about the circumference of the form over the fabric, a roller spaced from the form over which the cable runs, the position of said roller axially of the form controlling the position of the cable loop axially of the form, means for moving said roller axially of the form as the cable runs about the roller, means urging said roller in a direction to tension the cable and press the fabric under the cable loop against the drum, and means for driving the cable to advance the pressure area between the cable and the form longitudinally of the fabric.

17. An apparatus for building a container of a plurality of plies of coated cord fabric, comprising a substantially cylindrical building form having cord fabric thereon, an endless flexible cable having a loop substantially about the form over the fabric, a plurality of rollers on which the cable runs spaced from the form, means for urging at least one of said rollers in a direction to tension the cable to apply pressure to the fabric under the cable loop, means for driving said cable and rotating said form, and means for advancing said rollers axially of the form as the cable is driven to advance the cable loop longitudinally of the fabric, whereby the fabric is conformed to the building form and the individual plies are caused to adhere to each other as the pressure area under the cable loop traverses the fabric.

18. Apparatus for building a collapsible container having tapered end portions, said container being built of a plurality of plies of coated cord fabric, comprising a substantially cylindrical building drum having a tapered end portion, said drum having cord fabric wrapped therearound, a plurality of rollers spaced from the drum, an endless flexible cable disposed on said drum and said rollers to completely encircle the drum over the fabric, a pneumatic piston under substantially uniform fluid pressure urging at least one of said rollers in a direction to tension said cable and to maintain said cable loop completely about said drum, means for driving said cable and rotating said drum, and means coordinated with the speed of cable travel and the cable diameter to move said rollers longitudinally of the form to lay that portion of the cable entering the loop about the form adjacent that portion leaving said loop, whereby the pressure area under the cable and the fabric advances longitudinally of the fabric to conform the fabric to the building form and to press adjacent plies of cord fabric to each other.

19. The method of making a container having a cylindrical body and rounded ends of coated cord fabric, which comprises placing a ply of cord fabric about the body of a rotatable form having a cylindrical body and a rounded end, placing against this end of the form a ply of cord fabric so that the edges of the body ply and end ply may be overlapped, then smoothing said plies down successively into snug engagement with the form simultaneously entirely around the form by looping a cable entirely around the form over the body ply and by coiling a second cable over the end ply against the rounded end of the form, and advancing the cable loop longitudinally of the form over the body ply as the coiled cable is unwound from the end of the form by rotating the form, whereby the plies of cord fabric are condensed at their edges and pressed down evenly into snug engagement with the building form.

MARION M. CUNNINGHAM.

References Cited in the file of this patent

UNITED STATES PATENTS

| Number | Name | Date |
|---|---|---|
| 2,558,849 | Hodge | July 3, 1951 |
| 2,603,579 | Kramer | July 15, 1952 |